Sept. 8, 1970    H. J. KINNE    3,527,025
FASTENING MEANS FOR ELECTRICAL DISCHARGE WIRES
Filed July 9, 1968

INVENTOR
Hubert Josef Kinne
BY
Singer, Stern & Carlberg
Attorneys

United States Patent Office 3,527,025
Patented Sept. 8, 1970

3,527,025
FASTENING MEANS FOR ELECTRICAL DISCHARGE WIRES
Hubert Josef Kinne, Cologne-Bruck, Germany, assignor to Klockner-Humboldt-Deutz AG., Cologne-Deutz, Germany, a corporation of Germany
Filed July 9, 1968, Ser. No. 743,458
Claims priority, application Germany, July 31, 1967, 1,557,111
Int. Cl. B03c *3/41*
U.S. Cl. 55—148                     2 Claims

ABSTRACT OF THE DISCLOSURE

The individual electrical discharge wires of an electrostatic dust separator are secured with their upper ends, each in a separate sheet metal member of circular or semi-circular cross-section by a crimping (solder-less) or welding operation and the sheet metal member in turn extends through alined holes in a hollow supporting beam and is attached to said beam by a welding operation.

---

Figure 1:
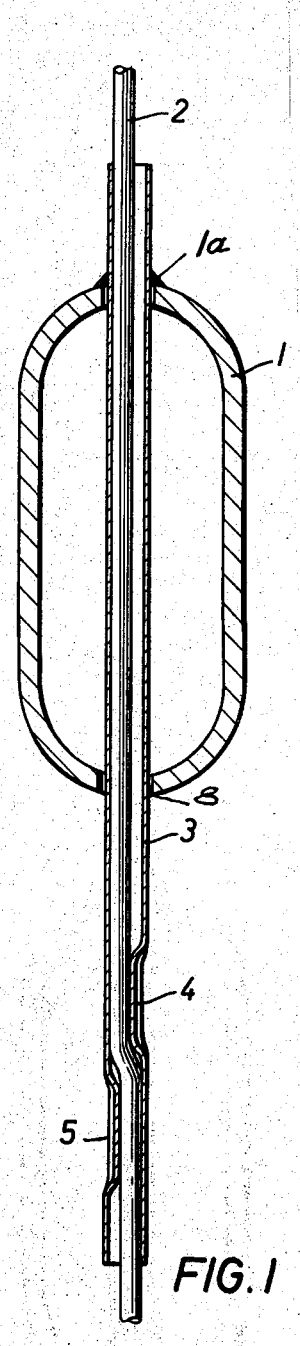

The invention relates to a fastening means for individually suspended electrical discharge wires in an electrostatic dust-separator.

With very large dust separators, for example, with an operative height of approximately 6 to 8 m., it is customary to suspend the electrical discharge wires with their upper end from a supporting beam and to attach at their lower end a counterweight. The fastening of the electrical discharge wires to the supporting beam represents difficulties insofar as the wires must also project to a certain extent into the space above the supporting beam so that also in this space a voltage field exists, and the gases passing through the space above the supporting beam are likewise purified. In this connection, on account of the strain on the electrical discharge wire caused by the knocking operation, it is not possible to weld the wire directly onto the supporting bar, as in many instances, a cross-sectional weakening of the wire occurs as a result of the welding operation. Additionally, the fastening must be so formed that a replacement of damaged electrical discharge wires is simply accomplished. For reasons of a simple and rational production and replacement of substitute parts, the fastening must be so constructed that electrical discharge wires of different diameter may be fastened with a uniform fastening means.

These problems are solved according to the invention in this manner, that the electrical discharge wire in the area of the supporting beam is fixedly connected with a sheet metal sleeve by a clamping or welding operation, which is attached to the supporting beam.

The advantage of the fastening means in accordance with the invention, lies therein, that for different types of electrical discharge wires with different diameter of the core wire, a uniform sleeve of sheet metal may be employed, which permits for example the use of uniform bores for the reception of the sleeve in the supporting beam. In this way, a substantial simplification in the manufacture is attained, the more so since frequently different types of electrical discharge wires are employed adjacent one another in a filter. A further advantage of this fastening means lies therein, that the sleeve may be tightly connected with an electrical discharge wire outside of the filter housing, and then only pushed through a corresponding bore in the supporting beam in the filter housing and is fixedly connected with the same for example by welding to the upper side of the supporting beam. This is of particular importance, especially in repair work, that is, upon replacement of damaged electrical discharge wires, as above the supporting beam, only little working space is available. Since the sleeve is pushed over the wire, in a simple manner a part of the electrical discharge wire may be left to project in sufficient length into the space above the supporting beam.

In further development of the invention, it is preferable that the sleeve of sheet metal is given a tubular shape and is pushed at the fastening point over the electrical discharge wire, and according to the type of a known solderless cable connection, is connected by deformation at several points with the electrical discharge wire. In such manner, there results a very simple fastening of the electrical discharge wire, since the connection of the electrical discharge wire with the sheet metal sleeve, which for example may already previously have been welded to the supporting beam, may be produced with known tools used later during the installation in the filter chamber.

In filters operating in a strongly corroding atmosphere, it is advisable when the sheet metal sleeve consists entirely or partially of a somewhat semicircularly bent sheet metal. The advantage of such a structure resides in this, that the electrical discharge wire on the inner side of this sleeve may be connected by a welding operation with the sleeve, so that a homogeneous, well-conductive connection of the sheet metal sleeve is attained also with the electrical discharge wire, which connection cannot be attacked by means of corrosion in such manner that the transfer resistance between the sleeve and the wire after some time is increased as a result of corrosion, as this may occur with the previously mentioned type of connections. By means of the form of the sleeve recommended according to the invention, it is possible without weakening of the cross-section of the wire, to produce a welded fastening of the electrical discharge wire spot-welding or a simple fillet weld between the sleeve and the wire. The sleeve itself is as before welded to the supporting beam.

The fastening means in accordance with the invention will be explained more in detail on the basis of the accompanying drawing which discloses a few different embodiments by way of example.

Figure 2:
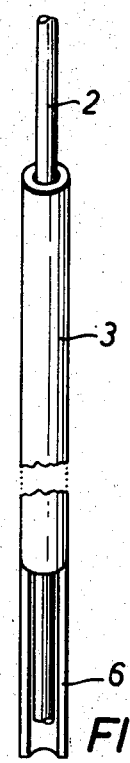
Figure 3:

In the drawings:

FIG. 1 is a cross-sectional view of a supporting beam with an electrical discharge wire clamped in a tubular sleeve, FIG. 2 illustrates a tubular sleeve formed with a fastening tongue, and FIG. 3 illustrates a further embodiment of the semi-circular fastening member for a welding-connection with a wire.

FIG. 1 shows a cross-sectional view of a supporting beam 1 of an electrofilter at the fastening point for an electrical discharge wire 2. A tubular sheet metal sleeve 3 is slidably moved over an electrical discharge wire 2. The interior diameter of the sleeve 3 is greater than the diameter of the electrical discharge wire but at its lower end, the sleeve is indented at axially spaced points 4 and 5 which are 180° offset from each other, so that these indentations clampingly secure the electrical discharge wire in the sleeve 3. The upper end of the sheet metal sleeve 3 projects from the top out of the supporting beam and is welded securely to the same at 1a. By means of this welding operation, a well-conductive electrical connection is produced between the sleeve 3 and the supporting beam 1 serving as supply conductor for the electric current. The connection between wire and sleeve produced by means of clamping under deformation of the sleeve at the lower end, illustrates a type of connection known per se for electrically conductive parts. Since by means of the offset arrangement of the deformation points, the wire within the sleeve is likewise correspondingly deformed, there is produced also with respect to any tension stresses caused by the counterweight attached to the wires 3 a good form-locking mechanical connection between the sleeve and the wire.

FIG. 2 shows another embodiment of the sleeve, which is particularly suitable for a welded connection between the sleeve and the wire. This form of the sleeve consists in its upper part of a circular pipe 3 which pipe has one half of its circular wall removed, so that a substantially semicircularly shaped fastening tongue 6 is produced. Along this tongue 6 the electrical discharge wire may be connected by spot-welding or also by means of a simple fillet weld with the sleeve, so that a homogeneous, well-conductive electrical connection is produced between the wire and the sleeve. The upper end of the sleeve 3 is welded to the supporting beam 1, as shown in FIG. 1.

FIG. 3 shows a fastening member 7 which is similar to the one shown in FIG. 2. It consists throughout its length of a strip of sheet metal bent substantially semicircularly. By means of this trough shaped fastener, the welding operation is very simple and easy, because the electrical discharge wire only needs to be placed laterally into the trough-like connector. Since the trough-like connector 7 is open to one side, the wire 2 may also to advantage be connected with the connector by the spot-welding method.

The invention is not limited to the embodiments of the fastening members shown by way of example. It would be possible to carry out the tubular or the semi-circularly shaped fastening members only so long that it projects directly into the lower bore 8 of the hollow supporting beam and is welded only to this lower side of the supporting beam, while the electrical discharge wire is continuous upwardly through the upper side of the supporting beam.

It would also be possible to provide the sleeve at its upper end additionally with a lug or a collar, which during the installation prevents the sleeve from falling through the bores in the supporting beam.

What I claim is:

1. Means for fastening individually suspended electrical discharge wires to a tubular supporting beam in an electrostatic dust separator in which said tubular supporting beam is provided in its wall with diametrically opposed vertically aligned apertures, comprising a tubular sheet metal sleeve extending transversely through said tubular supporting beam, and through said vertically aligned apertures and is welded to said beam at the place where said sheet metal sleeve passes through the upper one of said two vertically aligned apertures, both ends of said sheet metal sleeve projecting from said supporting beam, said sheet metal tube extending loosely through the lower one of said two apertures in said tubular supporting beam, said electrical discharge wire passing through the entire length of said sheet metal sleeve and outwardly therefrom and having a diameter which is less in size than the bore of said sheet metal sleeve, said electrical discharge wire being fixedly attached by means forming a solder-less connection to that portion of said sheet metal sleeve which extends downwardly from said tubular beam, said solder-less connection comprising indentations formed at axially spaced points and circumferentially offset from each other in said portion of said sheet metal sleeve, said indentations being of a depth to clampingly engage said electrical discharge wire in said sheet metal sleeve in such a manner that also a deformation of said otherwise straight electrical discharge wire takes place.

2. A fastening means according to claim 1, in which said tubular supporting beam is oblong in cross-section and has spaced opposite wall portions extending parallel to said sheet metal sleeves.

References Cited

UNITED STATES PATENTS

| 2,711,224 | 6/1955 | Herber | 55—147 |
| 2,762,413 | 9/1956 | Walter | 29—517 X |
| 2,856,674 | 10/1958 | Hill. | |
| 2,867,286 | 1/1959 | Streuber | 287—20.5 X |
| 2,867,287 | 1/1959 | Armstrong | 287—23 X |
| 3,354,617 | 11/1967 | Hoisington et al. | 55—148 X |

FOREIGN PATENTS

| 503,495 | 7/1930 | Germany. |
| 584,868 | 9/1933 | Germany. |
| 499,576 | 1/1939 | Great Britain. |
| 709,635 | 6/1954 | Great Britain. |

DENNIS E. TALBERT, Jr., Primary Examiner

U.S. Cl. X.R.

29—517, 630; 55—151; 248—1, 56, 58; 287—20.5, 23; 339—276, 278